United States Patent
Essig et al.

(10) Patent No.: US 10,411,639 B2
(45) Date of Patent: Sep. 10, 2019

(54) METHOD AND APPARATUS FOR DISSIPATING ELASTICALLY STORED ENERGY

(71) Applicant: WITTENSTEIN SE, Igersheim (DE)

(72) Inventors: Matthias Essig, Bad Mergentheim (DE); Andreas Spielmann, Randersacker (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 15/714,057

(22) Filed: Sep. 25, 2017

(65) Prior Publication Data

US 2018/0091084 A1 Mar. 29, 2018

(30) Foreign Application Priority Data

Sep. 26, 2016 (DE) ........................ 10 2016 118 170

(51) Int. Cl.
*H02P 29/032* (2016.01)
*H02P 3/18* (2006.01)

(52) U.S. Cl.
CPC .............. *H02P 29/032* (2016.02); *H02P 3/18* (2013.01); *H02P 2205/05* (2013.01)

(58) Field of Classification Search
CPC ...... H02P 4/00; H02P 8/14; H02P 8/12; H02P 8/22; H02P 2205/05
See application file for complete search history.

(56) References Cited

U.S. PATENT DOCUMENTS

| | | | |
|---|---|---|---|
| 4,517,506 A * | 5/1985 | Heinrich | B25B 23/147 318/432 |
| 5,285,857 A | 2/1994 | Shimada | |
| 5,459,386 A * | 10/1995 | Okachi | H02P 21/09 318/721 |
| 6,371,218 B1 * | 4/2002 | Amano | B25B 23/1405 173/176 |
| 6,744,240 B2 * | 6/2004 | Koelle | H02P 9/04 322/17 |
| 9,718,176 B2 * | 8/2017 | Elsmark | B25B 23/14 |
| 2011/0241583 A1 * | 10/2011 | He | H02P 21/0021 318/400.09 |

FOREIGN PATENT DOCUMENTS

DE  3929407 A1  3/1991

OTHER PUBLICATIONS

Office Communication issued in German Application No. 102016118170.6, dated Jul. 28, 2017. Machine Translation included.

* cited by examiner

*Primary Examiner* — Bickey Dhakal
(74) *Attorney, Agent, or Firm* — Meunier Carlin & Curfman LLC

(57) ABSTRACT

Method for dissipating the elastically stored energy of a tool operated with an electric motor (20), comprising determining the rotational speed of the electric motor; determining a limit torque for the electric motor (20) using the rotational speed, at which limit torque the energy is converted at least predominantly into copper losses of the electric motor; and driving the electric motor (20) by means of a rotational speed regulation with a decreasing rotational speed, while complying with the limit torque as motor torque upper limit.

14 Claims, 7 Drawing Sheets

METHOD AND APPARATUS FOR DISSIPATING ELASTICALLY STORED ENERGY

CROSS-REFERENCE TO RELATED APPLICATION

This application claim priority to DE application 10201611870.6 filed Sep. 26, 2016, which is hereby incorporated by reference in its entirety.

FIELD OF THE INVENTION

The invention relates to a method for dissipating the elastically stored energy of a tool operated with an electric motor, and to a tool comprising an electric motor.

PRIOR ART

The prior art discloses so-called power screwdrivers or heavy-duty screwdrivers operated with an electric motor, in which the electric motor drives a work spindle with interposition of a gear mechanism. The transmission ratio of the gear mechanism is high, such that elastic energy is stored in the mechanical system inter alia as a result of the stiffness of the gear mechanism during a screwing process. One example of the stored elastic energy comprises the torsional energy.

During a screwing process, the work spindle rotates in a tightening direction or securing direction of one element of the screw connection to be produced, for example a bolt or a nut. The screwing process is ended once a desired tightening torque has been reached. After the end of the screwing process, the stored elastic energy can bring about an acceleration of the work spindle counter to the tightening direction. This can have the effect that the electric motor rotates at a rotational speed which exceeds the nominal rotational speed or design rotational speed of said electric motor.

The document U.S. Pat. No. 5,285,857 A discloses a method for decelerating a heavy-duty screwdriver with electric motor and gear mechanism. In the conventional method, the rotor of the electric motor is blocked intermittently (see e.g. FIG. 3 of U.S. Pat. No. 5,285,857 A). This results in a jerky behavior of the electric motor. The energy is dissipated comparatively slowly, and motor and gear mechanism are severely loaded by the jerky jolts.

DISCLOSURE OF THE INVENTION

It is an object of the invention to specify an improved method for dissipating the elastically stored energy of a tool operated with an electric motor, or a tool operated with an electric motor for carrying out the method, wherein the energy is intended to be dissipated in particular rapidly or gently.

The object is achieved by means of a method as claimed in claim 1, and by means of a tool as claimed in the alternative independent claim.

A typical method according to the invention comprises determining the rotational speed of the electric motor; determining the limit torque for the electric motor using the rotational speed, at which limit torque the energy is converted at least predominantly into copper losses of the electric motor; and driving the electric motor by means of a rotational speed regulation with a decreasing rotational speed, whilst complying with the limit torque as motor torque upper limit.

The tool is for example a screwing tool, typically a power screwdriver or heavy-duty screwdriver. The tool can be embodied such that it is operated from the electricity supply or operated using batteries/rechargeable batteries. The tool can for example also act on workpieces or be embodied as part of a machine. Embodiments of the invention are implemented as stationary machines or as part of such machines. Further embodiments are implemented as hand-held appliances.

The rotational speed of the electric motor can be determined for example by means of a suitable rotational speed sensor or rotational speed encoder.

In exemplary embodiments, the rotational speed is determined in a sensorless manner. A sensorless determination of the rotational speed is possible for example as described in the document "Positionsgeberloser Betrieb von permanentmagneterregten Synchronmaschinen" ["Position-sensorless operation of permanent-magnet synchronous machines"]; Dr. Karsten Wiedmann; faculty of electrical engineering and information technology at the Gottfried Wilhelm Leibniz University of Hannover; 2012.

It is also possible to determine the rotational speed of the electric motor indirectly, for example by way of determination of the output rotational speed at the output of the gear mechanism or at the output of the electric motor.

The limit torque for the electric motor is determined using the rotational speed of the electric motor. At the limit torque, the energy is converted at least predominantly into copper losses of the electric motor.

In one exemplary description of the electric motor in the d/q coordinate system, the electrical power loss $P_v$ of the electric motor at which predominantly copper losses are generated results to an approximation as $$P_v = 3/2 \cdot R_q \cdot i_q^2.$$

wherein $R_q$ is the electrical resistance in the q-axis, and wherein $i_q$ is the current in the q-axis.

The mechanical power of the electric motor results as the product of the instantaneous motor torque M and the mechanical angular velocity $\omega_{mech}$.

Equating gives rise to $$M \cdot \omega_{mech} = 3/2 \cdot R_q \cdot i_q^2.$$

The motor torque M is dependent on the angular velocity and thus on the rotational speed n.

Using the determined rotational speed, the torque M is typically determined as a limit torque $M_{Lim}$ at which the energy in the electric motor is converted at least predominantly, typically to the extent of more than 90% or to the extent of more than 95% or at least substantially completely, into copper losses. In this case, "at least substantially" typically means that friction losses occur in addition to the copper losses in particular within the gear mechanism and motor, such that an 100% dissipation of the energy into copper losses does not occur. Apart from such losses brought about unintentionally, in typical exemplary embodiments the energy is intended to be converted as completely as possible into copper losses.

The electric motor is typically driven with a rotational speed regulation. Driving within the meaning of the method according to the invention is typically electrical operation of the electric motor, that is to say an energization or commutation of the electric motor.

In accordance with the method according to the invention, the rotational speed regulation for dissipating the elastically stored energy is operated such that the rotational speed decreases, wherein in accordance with the method the limit torque $M_{Lim}$ is complied with as an upper limit for the motor torque M by the rotational speed regulation.

The limit torque $M_{Lim}$ is typically incorporated in the rotational speed regulation as a limitation. A rotational speed of 0 is typically predefined as reduction of the rotational speed; however, it is also possible to predefine a rotational speed which is different than 0, as long as it is less than the instantaneous rotational speed n in terms of absolute value.

The performance of the method is typically begun immediately after the end of a screwing process.

With the method according to the invention the stored elastic energy can be dissipated rapidly, without the electric motor or the gear mechanism being excessively loaded, in particular without the electric motor or the gear mechanism being loaded jerkily.

The electric motor or the gear mechanism can be treated gently. Destruction of a motor link circuit by an excessively increased rotational speed and a high induced violate associated therewith can be avoided. Furthermore, what can be achieved is that no energy is fed into the link circuit while the method is carried out.

An advantageous, typically a continuous or homogenous, screwing sensation can be achieved.

In the case of a tool on which the method according to the invention is used, it is possible to dispense with additional components, in particular additional circuits for limiting the current or the voltage.

In typical embodiments, the method comprises the fact that the following method instructions are carried out repeatedly until a termination criterion is fulfilled: determining the rotational speed of the electric motor; determining the limit torque for the electric motor using the rotational speed, at which limit torque the energy is converted at least predominantly into copper losses of the electric motor; and driving the electric motor by means of a rotational speed regulation with a decreasing rotational speed, whilst complying with the limit torque as motor torque upper limit. Typically, the stated method instructions are performed successively in the order indicated, wherein the method continues with the first-mentioned method instruction again after the last-mentioned method instruction has been performed.

Typically, repeatedly carrying out the method instructions comprises the fact that the method instructions are performed continuously. Typically, the electric motor is driven continuously with the rotational speed regulation whilst complying with the limit torque as motor torque upper limit. The gentle operation of the electric motor or of the gear mechanism and/or the screwing sensation can be improved further.

Embodiments involved determining that the termination criterion is fulfilled if the rotational speed falls below a minimum rotational speed.

The rotational speed typically relates to a rotational speed in the counter-rotation direction. The counter-rotation direction is opposite to the tightening direction or securing direction. If the performance of the method is begun immediately after the end of a screwing process, the actual motor rotational speed is initially 0, and then assumes a value different than 0 in the counter-rotation direction, owing to the stored elastic mechanical energy. If the fact of whether the rotational speed has fallen below the minimum rotational speed is determined as the termination criterion, this takes place only after the value different than 0 has been assumed in the counter-rotation direction.

The minimum rotational speed is defined or definable beforehand, typically settable depending on the motor characteristic data.

Embodiments involve determining that the termination criterion is fulfilled if the limit torque falls below a minimum torque.

The minimum torque is defined or definable beforehand, typically settable depending on the motor characteristic data.

The method typically involves determining that the termination criterion is fulfilled if the rotational speed falls below a minimum rotational speed and if the limit torque falls below a minimum torque.

Embodiments involve determining that the termination criterion is attained if the rotational speed falls below a minimum rotational speed during a defined time period. Embodiments involve determining that the termination criterion is attained of the limit torque falls below a minimum torque during a defined time period. Typically, the method involves determining that the termination criterion is fulfilled if the rotational speed falls below a minimum rotational speed during a defined time period and if the limit torque falls below a minimum torque during a defined time period.

The defined time period is typically set to a time period of longer than 20 ms or longer than 50 ms and shorter than 1 s or shorter than 500 ms. By way of example, the defined time period is set to be longer than 100 ms and shorter than 200 ms.

The termination criteria are monitored by the control device starting from the beginning of the method according to the invention. The defined time period precludes the immediate termination of the method upon start-up in the event of a possibly initially low rotational speed and/or limit torque. Moreover, the defined time period can preclude a situation in which slight oscillation of the state variables leads immediately to termination of the method.

In embodiments, the minimum rotational speed is less than 10% of a nominal rotational speed of the electric motor. Typically, the minimum rotational speed is less than 5% or less than 3% of the nominal rotational speed of the electric motor. As a result, by way of example, the method can be carried out until gentle operation of the electric motor or of the gear mechanism is possible even in freewheeling, and further heating of the electric motor can be reduced.

In embodiments, the minimum torque is less than 20% of a nominal torque of the electric motor. Typically, the minimum torque is less than 15% or less than 10% of the nominal torque of the electric motor. As a result, by way of example, the method can be carried out until gentle operation of the electric motor or of the gear mechanism is possible even in freewheeling, and further heating of the electric motor can be reduced.

In embodiments, the limit torque is determined using a motor characteristic variable of the electric motor, wherein the motor characteristic variable comprises the motor voltage constant of the electric motor. The motor voltage constant of the electric motor is typically the quotient of the voltage in the motor and the angular velocity $\omega$ of the electric motor.

In embodiments, the limit torque is determined using a motor characteristic variable of the electric motor, wherein the motor characteristic variable comprises the interlinked outer conductor resistance of the electric motor.

Typically, the limit torque is determined using a motor characteristic variable of the electric motor, wherein the motor characteristic variable comprises the motor voltage constant and the interlinked outer conductor resistance of the electric motor.

By way of example, the limit torque M(n) is determined as a function of the mechanical rotational speed n in accordance with the following expression:

$$M(n) = c \cdot n$$

$$\text{where } c = \frac{3}{2} \frac{p^2 \cdot \Psi_p^2 \cdot 2 \cdot \pi}{\frac{R_{tt}}{2} \cdot 60} = \frac{k_e^2 \cdot \pi}{\frac{R_{tt}}{2} \cdot 60}$$

In this case, $k_e$ is the motor voltage constant, and $R_{tt}$ is the interlinked outer conductor resistance. These variables are typically available and readily predefinable for the motor.

In embodiments, the limit torque is determined as a value which is different than zero and which, at the determined rotational speed of the electric motor, lies in the range of 80% to 120% at least substantially in the region of the intersection point between the mechanical power of the electric motor and the electrical copper power loss of the electric motor.

The mechanical power of the electric motor and the electrical copper power loss of the electric motor are plotted, for example, for the determined rotational speed, as characteristic curves against the respective torque. The intersection point typically arises by equating the mechanical power with the electrical copper power loss. A different intersection point may arise at different rotational speeds.

A tool according to the present invention comprises an electric motor, a typically sensorless rotational speed determining device for determining the rotational speed of the electric motor, a regulation device for driving the electric motor in a regulated manner using the determined rotational speed, and a control device. The control device is configured to carry out a method described herein for dissipating the elastically stored energy. The control device is typically configured to correspondingly drive the regulation device in order to carry out the method.

The electric motor is typically operated or energized in a targeted manner such that the elastic mechanical energy is continuously dissipated and is converted only into copper losses of the electric motor, without jerky operation arising.

In embodiments, the control device is configured to carry out a method described herein which comprises: determining the rotational speed of the electric motor; determining the limit torque for the electric motor using the rotational speed, at which limit torque the energy is converted at least predominantly into copper losses of the electric motor; and driving the electric motor by means of a rotational speed regulation with a decreasing rotational speed, whilst complying with the limit torque as motor torque upper limit.

BRIEF DESCRIPTION OF THE DRAWINGS

Further advantages and features of preferred embodiments of the invention are explained below with reference to the accompanying drawings, wherein the figures show.

DESCRIPTION OF THE PREFERRED EXEMPLARY EMBODIMENTS

Typical embodiments are described below with reference to the figures, the invention not being restricted to the exemplary embodiments; rather, the scope of the invention is determined by the claims.

Figure 1:
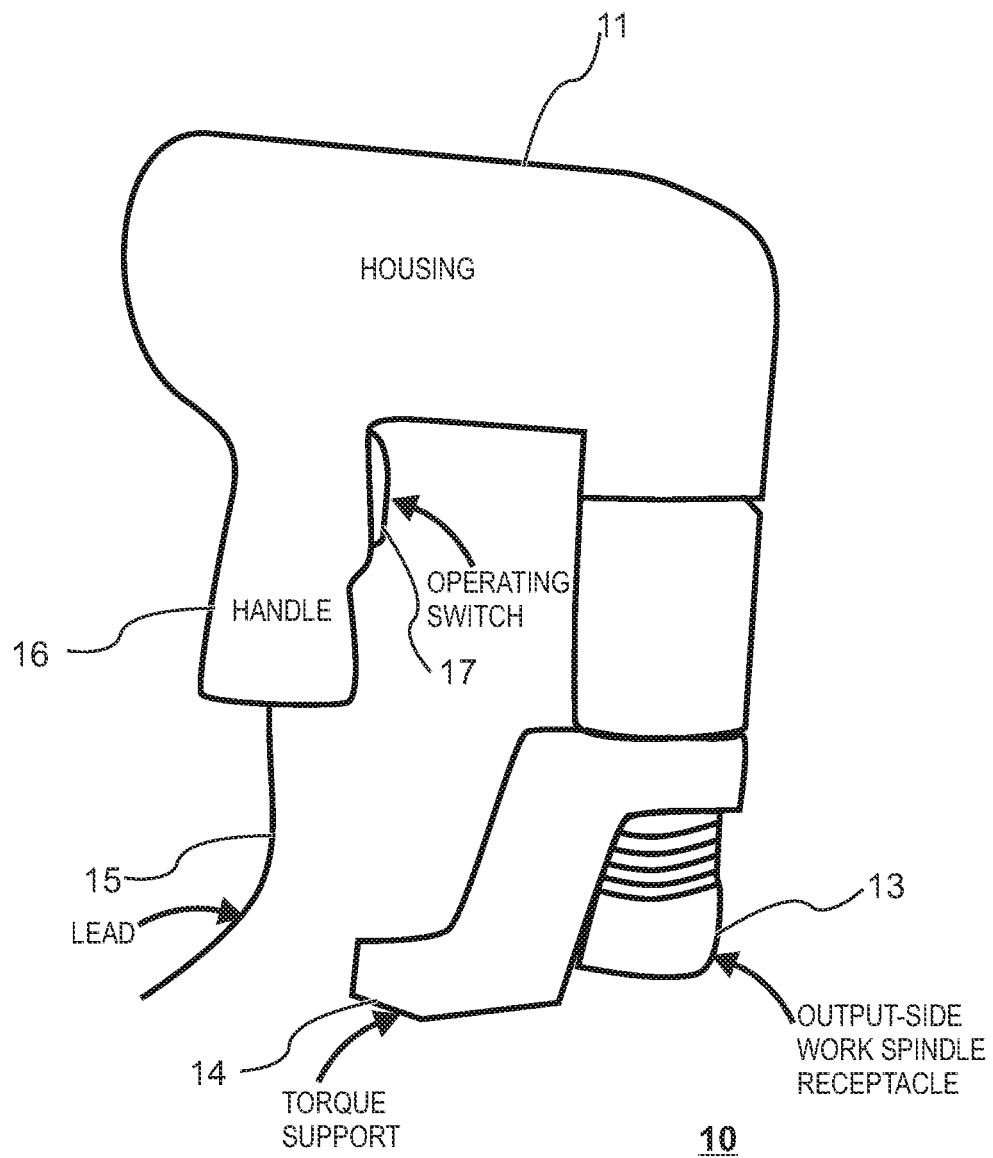
FIG. 1 is a schematic perspective view of a heavy-duty screwdriver for elucidating embodiments of the invention.

FIG. 1 shows a schematic perspective view of a heavy-duty screwdriver 1 for elucidating embodiments of the invention. The heavy-duty screwdriver in accordance with the illustration shown in FIG. 1 is shown as an angular screwdriver; however, the invention is not restricted to such tools, and for example non-angularly operating tools can also be operated by means of the method according to the invention.

An electric motor (not discernible in FIG. 1) and a gear mechanism (likewise not illustrated in FIG. 1) together with a rotational speed determining device, a regulation device and a control device are accommodated in a housing 11 of the heavy-duty screwdriver 1.

The heavy-duty screwdriver 1 is provided with a handle 16, on which an operating switch 17 is provided, which can be used to start a screwing process.

An output-side work spindle receptacle 13 serves to receive a screw head. A torque support 14 is provided in order to be able to apply a counter-torque for the screwing process. The heavy-duty screwdriver 1 illustrated is embodied as a tool operated from the electricity supply; a lead 15 serves for connecting the heavy-duty screwdriver 1 to a voltage supply.

During a screwing process, a setpoint screwing torque is predefineable for the heavy-duty screwdriver 1. A setpoint screwing torque that is predefineable in the case of a typical heavy-duty screwdriver 1 is for example greater than 5000 Nm or greater than 8000 Nm. During the screwing process, elastic mechanical energy is stored in the components of the heavy-duty screwdriver. This can comprise for example the twisting energy (torsional energy) of the gear mechanism or of the torque support 14 or the rotational energy in the electric motor or in the gear mechanism.

Figure 2:
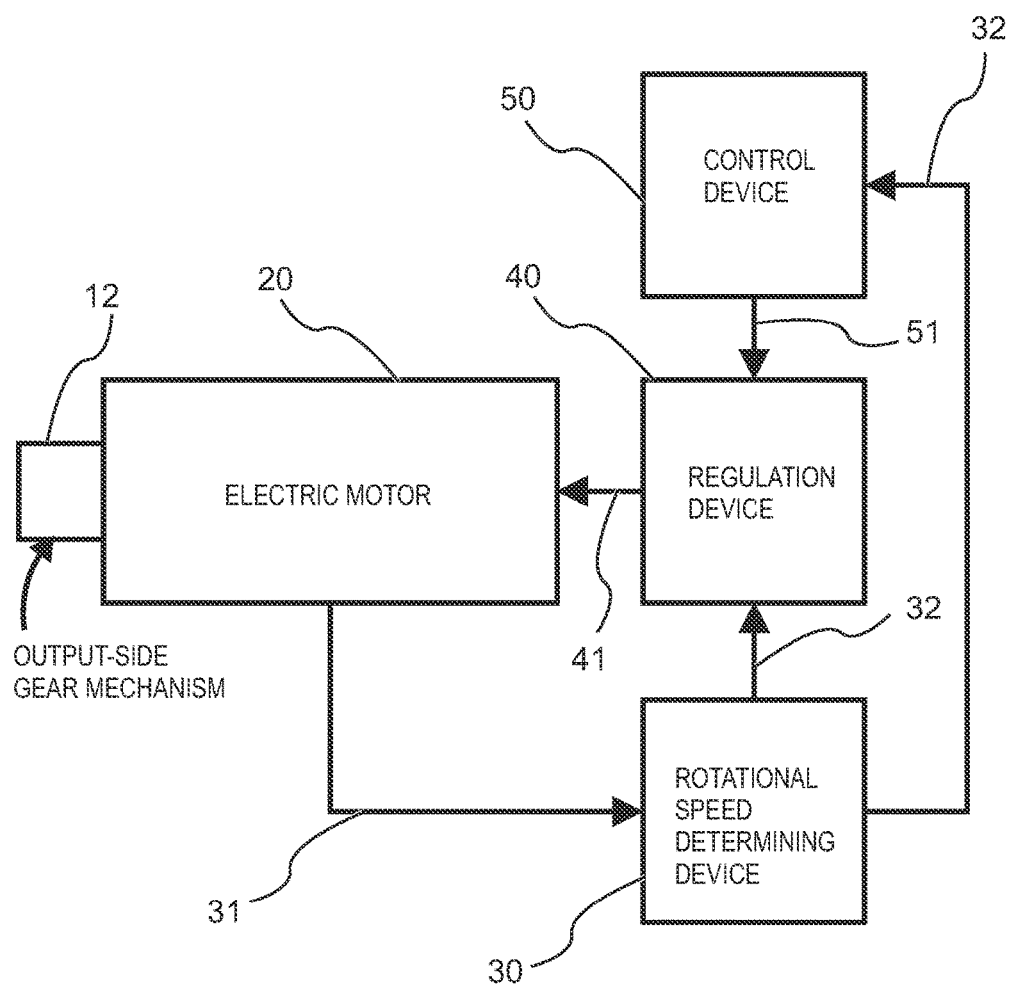
FIG. 2 is a block diagram for a tool configured for performing a method in accordance with one embodiment of the invention.

FIG. 2 is a block diagram for a tool configured for performing a method in accordance with one embodiment of the invention. The tool is for example the heavy-duty screwdriver 1 illustrated in FIG. 1.

An electric motor 20 with an output-side gear mechanism 12 is illustrated schematically in FIG. 2.

An encoder signal 31 from the electric motor 20 is fed to a rotational speed determining device 30. The rotational speed determining device 30 is configured to determine a rotational speed signal 32 from the encoder signal 31, wherein the rotational speed signal 32 corresponds to the instantaneous rotational speed of the electric motor 20. However, the invention is not restricted to an encoder-based rotational speed determination. The determination of the instantaneous rotational speed of the motor by the rotational speed determining device can also be carried out in a sensorless or encoderless manner, for example according to the method described in the document "Positionsgeberloser Betrieb von permanentmagneterregten Synchronmaschinen" ["Position-sensorless operation of permanent-magnet synchronous machines"]; Dr. Karsten Wiedmann; faculty of electrical engineering and information technology at the Gottfried Wilhelm Leibniz University of Hannover; 2012. Further sensorless regulation systems may be known and used from the prior art.

The rotational speed signal 32 is fed to a regulation device 40. The regulation device 40 outputs an output signal 41 to the electric motor 20 and thus drives the latter using the instantaneous rotational speed of the electric motor that results from the rotational speed signal 32.

The rotational speed signal 32 is furthermore fed to a control device 50. The control device 50 is configured to determine a limit torque for the electric motor 20 using the rotational speed from the rotational speed signal 32, at which limit torque the energy is converted at least predominantly into copper losses of the electric motor.

The control device outputs a limit torque signal 51 to the regulation device 40. For a method for dissipating the elastically stored energy in accordance with embodiments of the invention, the regulation device 40 drives the electric motor 20 such that the rotational speed is reduced; at the same time it uses the limit torque signal 51 to ensure that the motor torque does not exceed the predefined limit torque from the limit torque signal 51.

By way of example, as setpoint value for the rotational speed to which the regulation device 40 is intended to regulate the electric motor 20, a low rotational speed is specified which is less than a few hundred revolutions per minute, for example less than 200 min$^{-1}$ or less than 100 min$^{-1}$, typically of 0 min$^{-1}$.

The control device 50 determines the limit torque for the electric motor 20 regularly, typically continuously or at defined time intervals. By way of example, in the embodiment the rotational speed is determined by the rotational speed determining device 30 at a sampling frequency of 1 kHz and is fed to the control device 50 as rotational speed signal 32. If the rotational speed of the electric motor changes, then the limit torque typically changes as well. The control device 50 can for example likewise determine the limit torque with a clock frequency of 1 kHz and feed it to the regulation device 40, such that a continuous adaptation of the stipulation of the upper limit for the motor torque takes place in the regulation device 40.

In embodiments, use is made of sampling rates for the rotational speed at e.g. at least 0.5 kHz, at least 1 kHz or at least 2 kHz. In typical embodiments, the limit torque is determined at a clock frequency of at least 0.5 kHz, at least 1 kHz or at least 2 kHz. Typically, steps a) to c) are performed repeatedly at a frequency of at least 0.5 kHz, at least 1 kHz or at least 2 kHz.

The invention should not be understood in a restrictive way to the effect that the regulation device 40, the rotational speed determining device 30 and/or the control device 50 must be provided as separate components or circuits. This differentiation is effected herein only for reasons of comprehensibility, and the regulation device 40, the rotational speed determining device 30 and/or the control device 50 can also be embodied in an integrated fashion, embodied as common circuit(s), etc.

Figure 3:
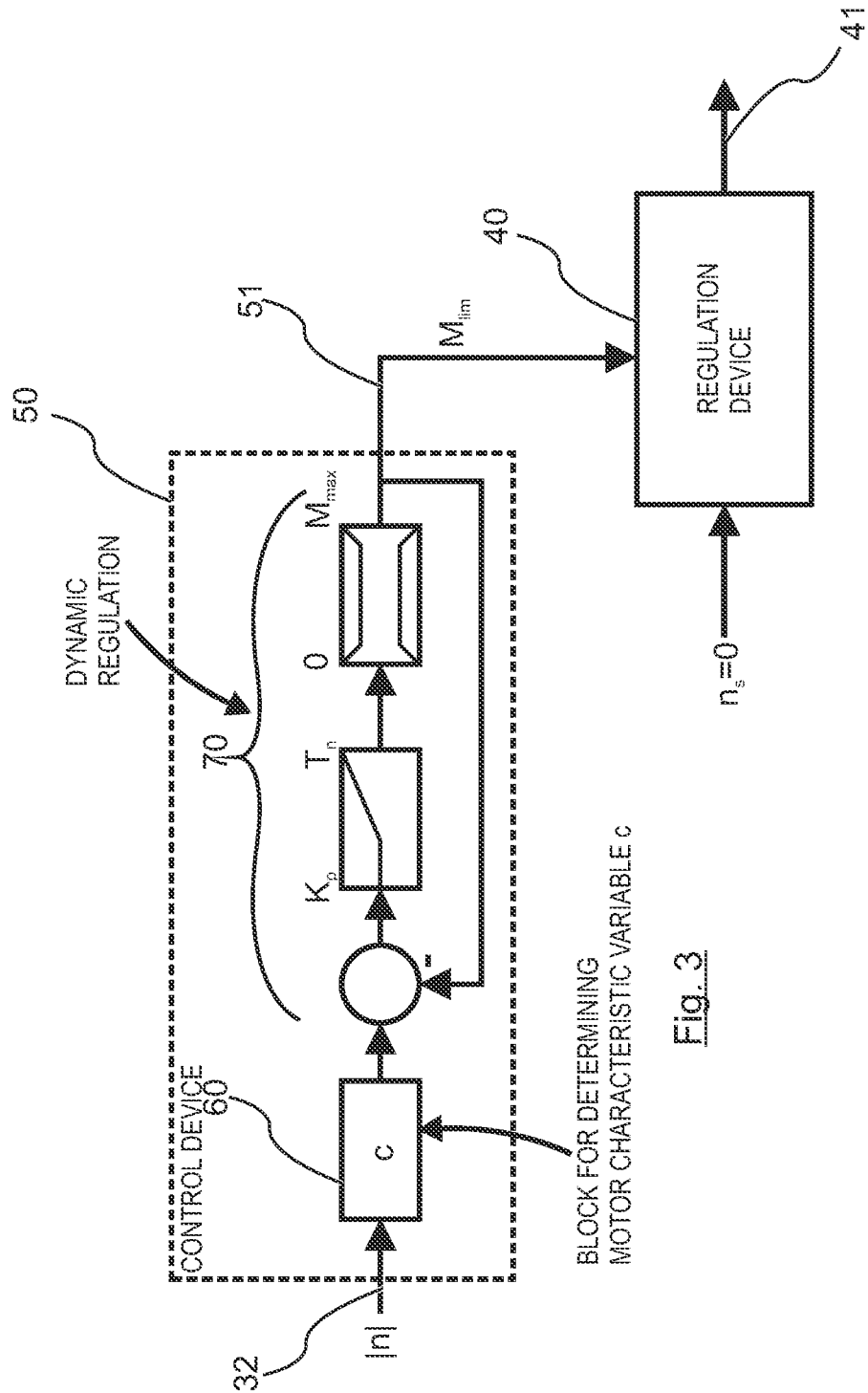
FIG. 3 is a schematic regulator circuit diagram for performing a method in accordance with one embodiment of the invention.

FIG. 3 is a schematic regulator circuit diagram for performing a method in accordance with one embodiment of the invention. The absolute value |n| of the mechanical rotational speed, for example the rotational speed signal 32 from the rotational speed determining device 30, is fed to a block 60 for determining the motor characteristic variable c. The motor characteristic variable c is determined as follows in accordance with the embodiment:

$$c = \frac{3}{2} \frac{p^2 \cdot \Psi_p^2 \cdot 2 \cdot \pi}{\frac{R_{tt}}{2} \cdot 60} = \frac{k_e^2 \cdot \pi}{\frac{R_{tt}}{2} \cdot 60}$$

In this case, $k_e$ is the motor voltage constant, and $R_{tt}$ is the interlinked outer conductor resistance. These variables are typically available and readily predefinable for the motor.

In a subsequent dynamic regulation, designated in its entirety by 70 in FIG. 3, in the embodiment illustrated, the constants $K_p$, $T_N$ are used to stipulate that a regulation to a rotational speed of 0 is intended to be carried out within a limited time period, for example within 3 seconds or within 1 second. A limit torque $M_{lim}$ is determined therefrom and is predefined as limit torque signal 51 for the regulation device 40. The regulation device is configured in such a way that the value predefined via the limit torque signal 51 as motor torque upper limit is not exceeded during the driving of the electric motor 20. Typically, the regulation device is configured in such a way that the value predefined via the limit torque signal 51 as value of the motor torque upper limit is at least almost attained, but not exceeded. A value of 0 is furthermore predefined as setpoint rotational speed ns, for the regulation device 40. The regulation device 40 outputs to the electric motor an output signal 41 for which these stipulations are fulfilled.

The dynamic regulation shown in FIG. 3 can be used to set the transient recovery response of the limit torque $M_{lim}$. However, the dynamic regulation 70 is merely by way of example, and the invention is not restricted to the use of a dynamic regulation 70. By way of example, it is also possible to dispense with a dynamic regulation 70 in typical methods described herein. Typically, the limit torque $M_{lim}$ will be determined directly from the product of the motor characteristic variable c and the rotational speed n.

Figure 4:
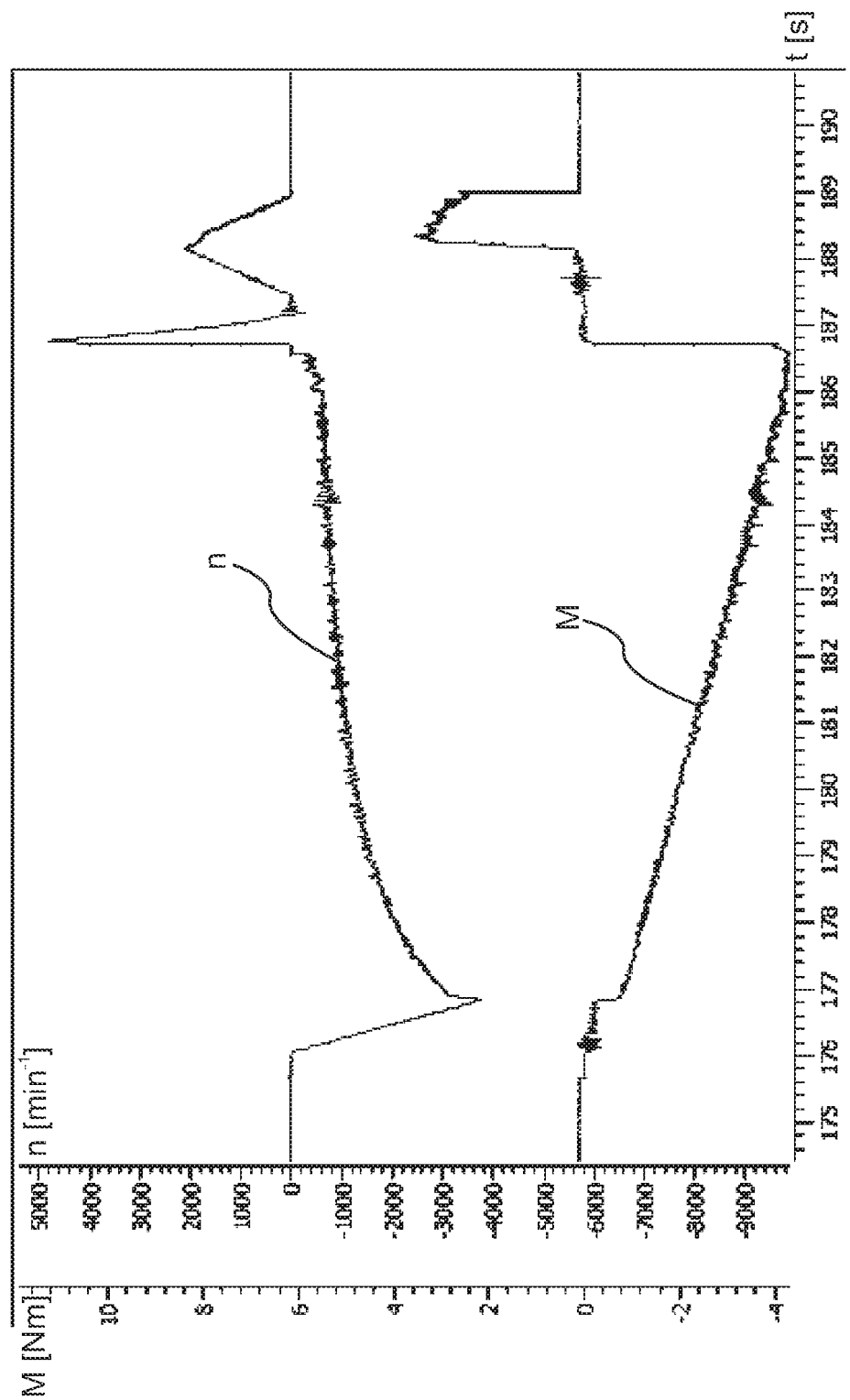
FIG. 4 is a combined diagram showing the torque and the rotational speed of the electric motor during a screwing process and after the end of a screwing process, without performance of a method in accordance with one embodiment of the invention.

FIG. 4 is a combined diagram showing the temporal profile of the torque M and the rotational speed N of the electric motor 20 during a screwing process and after the end of a screwing process, without performance of a method in accordance with one embodiment of the invention.

After a short start-up phase until approximately 177 s, the rotational speed n gradually decreases, and the torque M builds up. The setpoint torque is attained between 186 s and 187 s. Then, no torque is applied to the motor and the stored elastic energy discharges abruptly. In the case illustrated in FIG. 4 without use of the method according to the invention, the motor jumps from approximately −500 min$^{-1}$ through 0 min$^{-1}$ to a high reverse rotational speed of approximately 5000 min$^{-1}$. This can constitute a mechanical loading for the electric motor or the gear mechanism; furthermore, such a high reverse rotational speed can have the effect that undesirably high or impermissibly high voltages are induced in the link circuit of the electric motor.

The rise in the rotational speed that takes place at approximately 188 s corresponds to a desired (targeted, aimed for) reverse rotation of the motor in order to be able to take away the tool.

Figure 5:
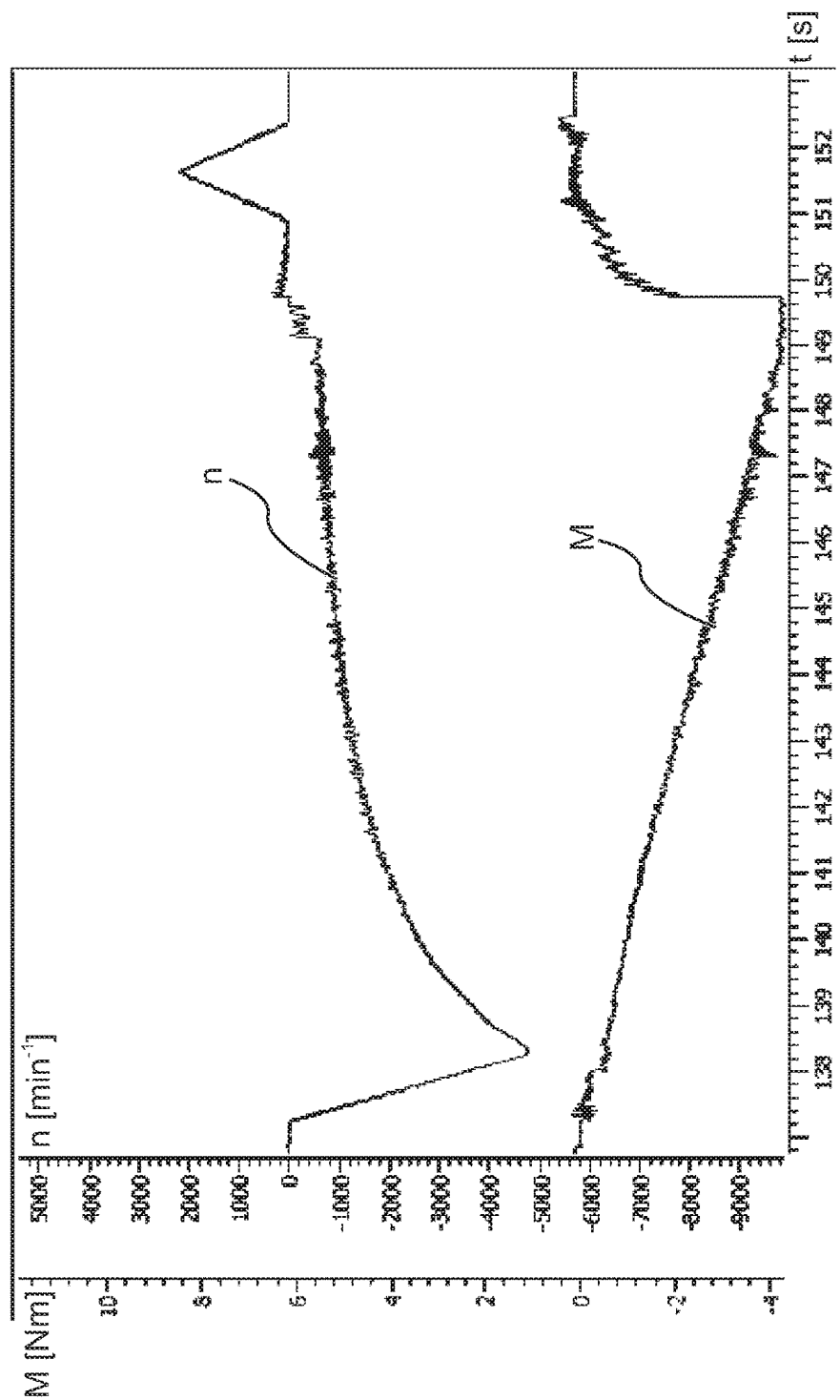
FIG. 5 is a combined diagram showing the torque and the rotational speed of the electric motor during a screwing process and after the end of a screwing process, with performance of a method in accordance with one embodiment of the invention.

FIG. 5 is a combined diagram showing the temporal profile of the torque M and the rotational speed n of the electric motor 20 during a screwing process and after the end of a screwing process, with performance of a method in accordance with one embodiment of the invention.

After a short start-up phase until approximately 138 s, the rotational speed gradually decreases and the torque builds up. The setpoint torque is attained between 149 s and 150 s. A method according to one embodiment of the invention is then carried out. The motor is not switched off or not energized, as in the case of FIG. 4, but rather is regulated starting from approximately 149.8 s such that a predefined torque-dependent maximum reverse rotational speed n is not exceeded. The stored elastic energy of the system is converted gradually into electrical energy loss in the form of copper losses in the motor. The torque therefore gradually falls back between approximately 150 s and 151 s.

As a result, it is possible to avoid the occurrence of a high reverse rotational speed of the electric motor after the end of the screwing process (upper line in FIG. 5), with a good screwing sensation at the same time.

The rise in the rotational speed that takes place at approximately 151 s corresponds to a desired (targeted, aimed for) reverse rotation of the motor in order to be able to take away the tool.

The method is carried out in accordance with the embodiment until a termination criterion is fulfilled. The termination criterion defines for example when the stored elastic energy has fallen below a lower threshold value. In accordance with the embodiment, the termination criterion is assumed to be fulfilled when the calculated limit torque and the rotational speed have fallen below respectively defined thresholds for a defined time period.

The termination criteria are monitored by the control device 50 starting from the beginning of the method according to the invention.

The thresholds are typically set depending on the motor, wherein the threshold for the limit torque lies for example in the range of 5-15% of the maximum torque of the electric motor (of the nominal torque), and wherein the threshold for the rotational speed lies for example in the range of 1-3% of the nominal motor rotational speed.

The defined time period can be set to 100 ms, for example, or to 200 ms, for example.

Figure 6:
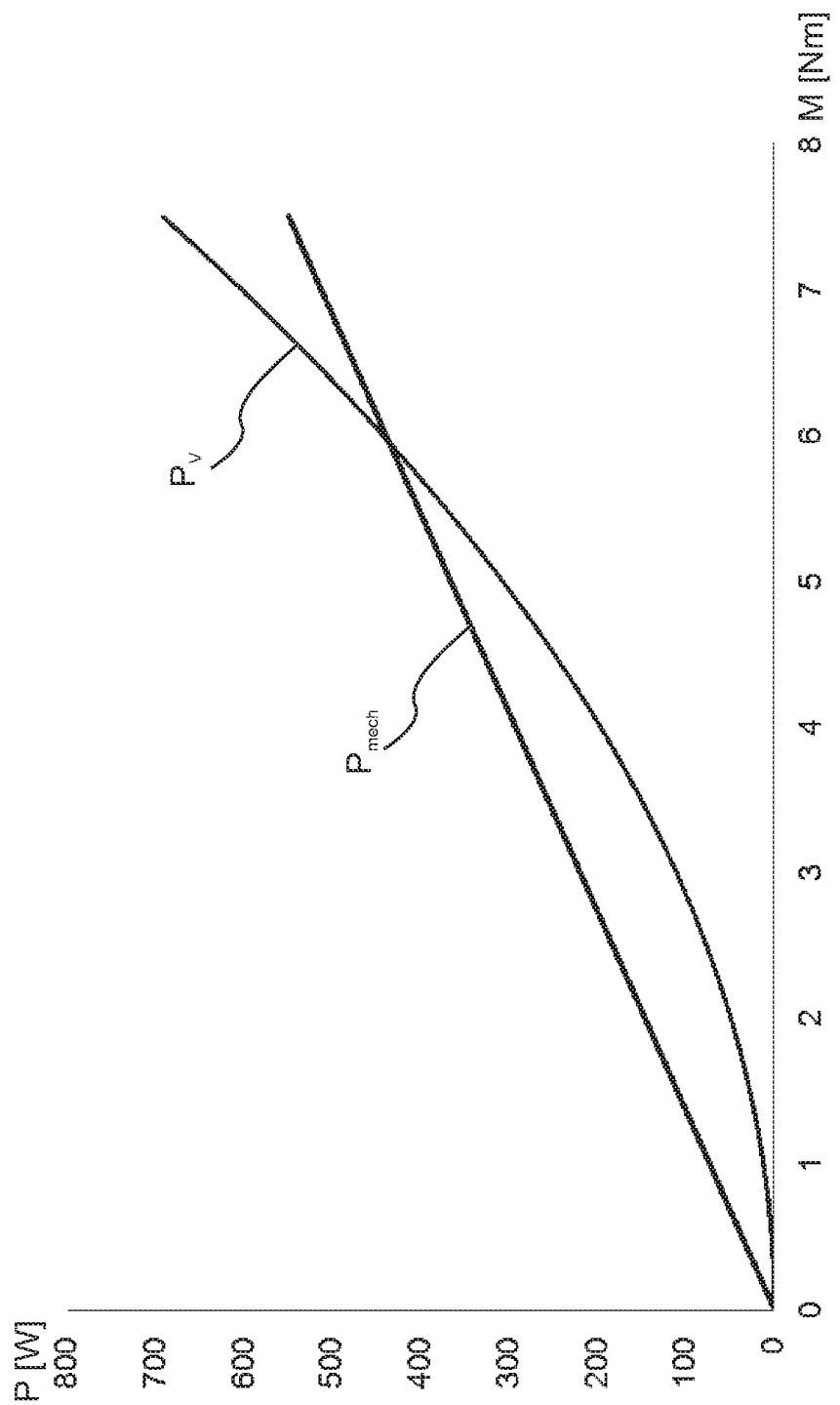
FIG. 6 is a diagram showing the determination of the limit torque, in a method in accordance with one embodiment of the invention.

FIG. 6 is a diagram showing the determination of the limit torque, in a method in accordance with one embodiment of the invention.

In FIG. 6, by way of example, the electrical power loss $P_v$ and the mechanical power $P_{mech}$ of the motor are plotted against the motor torque M, specifically in the case of a rotational speed n of 700 revolutions per minute ($min^{-1}$) chosen by way of example.

An intersection point different than zero between the electrical power loss and the mechanical power of the motor can be discerned at 6 Nm in the case illustrated by way of example.

In the case of a torque of 6 Nm, the mechanical power is equal to the electrical copper power loss at said rotational speed of 700 $min^{-1}$. In embodiments, the limit torque is determined as a value which is different than zero and which, at the determined rotational speed of the electric motor, lies in the range of 80% to 120%, typically at least substantially in the region of 100% of such an intersection point.

Figure 7:
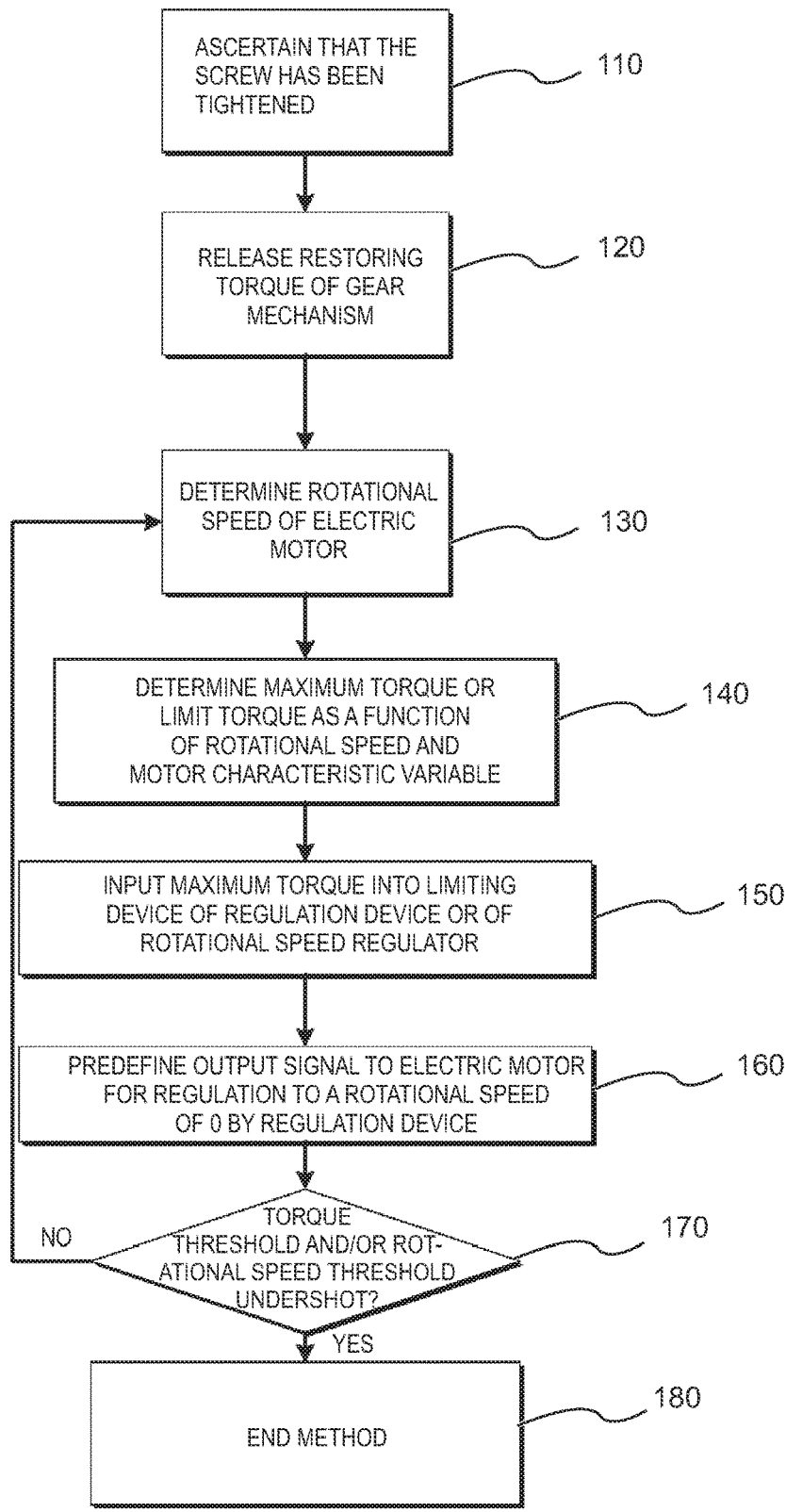
FIG. 7 is a flow diagram for a method in accordance with one embodiment of the invention.

FIG. 7 is a flow diagram for a method in accordance with one embodiment of the invention.

110 involves ascertaining that the screw has been tightened, that is to say that the tightening torque or the tightening angle has been attained.

In 120, the restoring torque of the gear mechanism is released. A method in accordance with a typical embodiment of the invention is begun after 120.

In 130, the rotational speed of the electric motor is determined, for example measured at a sampling frequency of 1 kHz.

In 140, a maximum torque or limit torque is determined as a function of the rotational speed and a motor characteristic variable, as described herein.

In 150, the maximum torque is input into a limiting device of the regulation device or of the rotational speed regulator.

160 involves predefining an output signal to the electric motor for regulation to a rotational speed of 0 by the regulation device, wherein the maximum torque is taken into account by the regulation device.

170 involves determining whether or not a previously defined or definable torque threshold and a previously defined or definable rotational speed threshold have been undershot.

In the case where it is determined in 170 that said thresholds have not been undershot, a return to 130 is carried out.

In the case where it is determined in 170 that said thresholds have been undershot, the method continues with 180.

In 180, the method according to the invention in accordance with the embodiment is ended.

The sequence of a method in accordance with one embodiment of the invention is explained below. For the screwing process, that is to say before the start of the method for dissipating the elastically stored energy in accordance with the embodiment, a setpoint screwing torque that is attained in the screwing process is predefined.

This has the effect that at the beginning of the method for dissipating the elastically stored energy in accordance with the embodiment, the screw is initially fixed. At this point in time, the limit torque corresponds to the setpoint screwing torque. The limit torque is the output torque at which the mechanical power is in equilibrium with the copper losses of the electric motor. This in turn has the effect that the motor does not rotate at this point in time, whereupon n*c=0 ensues.

This results in a decreasing limit torque, wherein the decrease in the limit torque is settable via the dynamic regulation 70 in accordance with the embodiment. A regulated rotational movement of the motor ensues therefrom.

In the embodiment, at a constant sampling frequency, for example of 1 kHz or of 2 kHz, the rotational speed n is then determined continually and the corresponding limit torque is calculated from n*c.

Said limit torque influences a limiting device of the regulation device 40, which is embodied as a rotational speed regulator. The regulation device 40 predefines a motor torque upper limit for regulation to rotational speed 0. Thus the regulation device 40 then continuously reduces the rotational speed whilst taking account of the motor torque upper limit corresponding to the value for the limit torque that was received last by the regulation device 40. As soon as the regulation device 40 receives a new value for the limit torque, the regulation device 40 correspondingly adapts the motor torque upper limit. The limit torque corresponds to the motor torque upper limit during the dissipation of the elastically stored energy in accordance with the method according to the embodiment.

The invention claimed is:

1. A method for dissipating the elastically stored energy of a tool operated with an electric motor, comprising:
   a) determining the rotational speed of the electric motor;
   b) determining a limit torque for the electric motor using the rotational speed, at which limit torque the energy is converted to the extent of more than 90% into copper losses of the electric motor;
   c) driving the electric motor by means of a rotational speed regulation with a decreasing rotational speed, whilst complying with the limit torque as motor torque upper limit, wherein the limit torque is determined as a value which is different than zero and which, at the determined rotational speed of the electric motor, lies in the range of 80% to 120% of an intersection point between a mechanical power of the electric motor and the copper loss of the electric motor.

2. The method as claimed in claim 1, wherein the method instructions a)-c) are performed repeatedly in particular at a frequency of 0.5 kHz or greater until a termination criterion is fulfilled.

3. The method as claimed in claim 2, wherein the termination criterion is fulfilled if the rotational speed falls below a minimum rotational speed.

4. The method as claimed in claim 2, wherein the termination criterion is fulfilled if the limit torque falls below a minimum torque.

5. The method as claimed in claim 4, wherein the termination criterion is fulfilled if the limit torque falls below a minimum torque and the rotational speed falls below the minimum rotational speed.

6. The method as claimed in claim 3, wherein the termination criterion is attained if the rotational speed falls below the minimum rotational speed during a defined time period and/or if the limit torque falls below a minimum torque during a defined time period.

7. The method as claimed in claim 3, wherein the minimum rotational speed is less than 10% or less than 5% or less than 3% of a nominal rotational speed of the electric motor.

8. The method as claimed in claim 3, wherein the minimum torque is less than 20% or less than 15% or less than 10% of a nominal torque of the electric motor.

9. The method as claimed in claim 3, wherein the termination criterion is attained if the limit torque falls below the minimum torque during a defined time period.

10. The method as claimed in claim 1, wherein the limit torque is determined using a motor characteristic variable of the electric motor, wherein the motor characteristic variable comprises the motor voltage constant of the electric motor.

11. The method as claimed in claim 10, wherein the motor characteristic variable comprises the interlinked outer conductor resistance of the electric motor.

12. A tool comprising:
   an electric motor;
   a rotational speed determining device for determining the rotational speed of the electric motor;
   a regulation device for driving the electric motor in a regulated manner using the determined rotational speed; and
   a control device configured to carry out a method as claimed in claim 1.

13. A method for dissipating the elastically stored energy of a screwing tool operated with an electric motor, comprising:
   a) determining the rotational speed of the electric motor;
   b) determining a limit torque for the electric motor using the rotational speed, at which limit torque the energy is converted at least predominantly into copper losses of the electric motor;
   c) driving the electric motor by means of a rotational speed regulation with a decreasing rotational speed, whilst complying with the limit torque as motor torque upper limit, wherein the performance of the method is begun immediately after the end of a screwing process, wherein the limit torque is determined as a value which is different than zero and which, at the determined rotational speed of the electric motor, lies in the range of 80% to 120% of an intersection point between a mechanical power of the electric motor and the copper loss of the electric motor.

14. A method for dissipating the elastically stored energy of a tool operated with an electric motor, comprising:
   a) determining the rotational speed of the electric motor;
   b) determining a limit torque for the electric motor using the rotational speed in a counter-rotation direction, the counter-rotation direction being opposite to a tightening or securing direction, at which limit torque the energy is converted at least predominantly into copper losses of the electric motor;
   c) driving the electric motor by means of a rotational speed regulation with a decreasing rotational speed, whilst complying with the limit torque as motor torque upper limit, wherein the limit torque is determined as a value which is different than zero and which, at the determined rotational speed of the electric motor, lies in the range of 80% to 120% of an intersection point between a mechanical power of the electric motor and the copper loss of the electric motor.

* * * * *